Nov. 30, 1965    C. L. DU VIVIER    3,221,299
TRAFFIC CONTROL AND SELECTOR APPARATUS
Filed Aug. 11, 1960    3 Sheets-Sheet 1

INVENTOR.
CHARLES L. DU VIVIER
BY
Edward W. Eames
ATTORNEY

Nov. 30, 1965  C. L. DU VIVIER  3,221,299
TRAFFIC CONTROL AND SELECTOR APPARATUS
Filed Aug. 11, 1960  3 Sheets-Sheet 3

INVENTOR.
CHARLES L. DU VIVIER
BY
Edward H. Cairns
ATTORNEY ated Nov. 30, 1965

3,221,299
TRAFFIC CONTROL AND SELECTOR APPARATUS
Charles L. Du Vivier, Darien, Conn., assignor, by mesne assignments, to Laboratory for Electronics, Inc., Boston, Mass., a corporation of Delaware
Filed Aug. 11, 1960, Ser. No. 49,053
9 Claims. (Cl. 340—35)

The present invention relates to traffic control apparatus and more particularly to improved selection apparatus for comparison of two sets of inputs from traffic measuring devices or the like and for providing a selected output depending on the relation of the inputs.

More particularly, in one aspect, the present invention relates to a master-local traffic control system in which a master controller includes an improved system selector apparatus or selector unit for receiving multiple inputs from at least two measuring sources, where the inputs from such measuring source individually represent a measurement within a segment of a segmented scale of measurements, and for determining the relation between the received inputs and providing outputs indicative of certain such relations.

As one example of some features of application of the invention, two sets of several input circuits each may be derived from two traffic measuring sources for two different traffic directions, and represent two scales of several segments, with an input received at any one time on only one input circuit of each set, and the preset selector apparatus will provide improved means for comparing the received inputs, providing a first output when the received input in the first set is at least a predetermined number of segments higher than the received input on the second set, and providing a second output when the received input in the second set is at least a predetermined number of segments higher than the received input on the first set, and a third output may also be provided when the received inputs from the respective sets are not at least a predetermined number of segments apart.

A further feature of the present improved apparatus is the provision of a convenient and positive adjustment of preselection of the desired minimum number of segments of separation of inputs for preferential output or other output representing sufficient imbalance in inputs, such adjustment of preselection being in the present apparatus directly related to the segments or steps.

The present invention also, in another aspect, relates to improved reversible traffic lane control apparatus, in which is included such improved selector unit for selectively providing outputs indicative of relative traffic conditions on a roadway, which improved controller apparatus may be used to substitute for the master control apparatus associated with the lane changing apparatus, such as the type disclosed in my copending application Serial Number 27,605 filed May 9, 1960, under the title "Traffic Actuated Control Apparatus," for control or reversal of direction of traffic flow on a roadway, or a part thereof.

A further aspect of the invention provides an improved controller, which may be employed as a master or other controller, for example, in which two sets of several input circuits representing two scales of several segments of two different traffic characteristics are provided with one input circuit only, of the several input circuits of one set of input circuits, energized with the input circuits that are energized being varied directly according to respective current traffic characteristics trends, and in which such two sets of input circuits are applied to an improved selector unit for providing an output representing the relation between the two traffic characteristics. Such output of the selector unit would vary according to the relation between the energized input circuits so that the output of the selector unit may represent the relation between current traffic characteristics.

This improved controller, in its preferred form, may include a novel restrictive output timing device for providing an output, which after conforming its output to the output of the selector unit may time an interval of desired time during which the conformed output of the restrictive output timing device may not change, but after termination of such timed interval may permit a change of its output at any time after such terminated interval.

In one preferred form an improved selector unit of the improved master controller includes at least two symmetrical sets of circuits for accepting varying inputs, each input substantially corresponding to the other in character, and applied to or affecting one or more relays in a chain of relays where there are at least two chains of opposing relays, each chain including the same number of relays. The same inputs from the same source, such as a measuring or counting device, for example, may each represent a different segment of a scale or step or value or range of values in a scale of values of the factor measured or counted, with a minimum value and a maximum value as the low and high values of the steps respectively and with the other segments or steps graduated in value between the low and the high values.

In the field of traffic control certain characteristics of traffic, as for example, the volume of traffic on a lane or roadway or, the density of traffic on a lane or roadway or, the average speed of traffic on a lane or roadway or, other measurable traffic characteristics, or a combination of traffic characteristics, have been used as a determinant of the quality of the traffic flow along a roadway or group of roadways on which the characteristics are measured. These measured traffic characteristics may each be valued against a predetermined scale for each characteristic for that particular lane or roadway or that particular traffic flow.

Thus, such individual traffic characteristic may be measured or counted and calibrated within a predetermined scale of measurements. The value of the current measurements as determined by the particular measuring device may thus be represented by the energization of an output representing a segment of a range of measurements into which the current measurement falls, the segment being one of a series of segments in a scale of values of the traffic characteristic being measured.

Along these lines U.S. Patent No. 2,288,601 issued to John L. Barker on July 7, 1942, under the title "Traffic Cycle Selector Apparatus" and assigned to the same assignee as the present application, provides a cycle selector apparatus which, over a period of time, determines a measurement of a sampling of a traffic characteristic, such as volume of traffic, for example, and at the end of such timed period provides an energized output representing a segment of a range of measurements of a segmented scale of traffic volume on a lane or roadway with the initial energized output being the lowest segment of the scale of measurements with subsequent adjustment of the energized output made periodically step by step at the end of subsequent sampling time periods until the energized output is the segment of measurements into which the determined measurement falls. The said U.S. Patent 2,288,601 illustrates a cycle selector apparatus providing six output circuits or steps which may each represent a segment of a range of values of a graduated scale of segmented values of a traffic characteristic.

This prior cycle selector apparatus has been employed successfully with a system selector apparatus such as that taught by John L. Barker in his U.S. Patent 2,542,978 issued February 27, 1951, under the title "Traffic Actuated Control Apparatus" and assigned to the same assignee as the present application. The sets of outputs of two cycle selectors, which may be of the type taught in U.S. Patent 2,288,601 are applied to a system selector apparatus taught in said Patent 2,542,978 and selection among traffic plans, as for example inbound offset, outbound offset and average offset, is made in accordance with the relative positions of two such cycle selectors as taught in Patent 2,542,978.

Some of the broader aspects of the apparatus and system disclosed in the present application are the subject of said Patent 2,542,978, such as some of the broader features in the selection among traffic plans or outputs in accordance with the relations between the two inputs, from two traffic measurement sources, for example.

The present invention generally relates to an improved system or apparatus including the feature of chain relay circuitry in the selection of outputs in accordance with certain relations between inputs, or including an improved minimum timing protective feature between successive outputs selections, or both, as more fully set forth below.

As taught in Patent 2,542,978, selection by a system selector of a traffic plan or offset is made in accordance with the polarity and magnitude of the difference between electrical voltages related to the inputs. In accordance with the relative positions, in a scale of positions, of two energized input circuits one from each of two cycle selectors, for example, the polarity and magnitude of potential difference is sensed to control the operation of one or another of two electronic tube circuits for output selection. A potentiometer provides adjustment of the minimum magnitude of the difference required for selection of particular outputs.

The improved selector unit of the present application provides relay chain circuitry for selection of offsets or other selection in response to two sets of inputs providing one output when one input is substantially higher than the other, which may correspond to inbound offset, for example, a second output when the reverse condition occurs, which may correspond to outbound offset, for example, and a third output when substantially balanced traffic occurs, which may correspond to average offset, for example, or when neither input is sufficiently predominant over the other.

In its preferred form, the selector unit of the present application is arranged to accept two sets of six inputs each, for example, which two sets of inputs may be the individual sets of six outputs from two cycle selectors of the type disclosed in the said U.S. Patent 2,288,601, for example. It will be obvious to those skilled in the art that although the present specification and drawings are presented herein with six inputs in each set of inputs to the selector unit, less than six inputs in each set of inputs may be used for providing a comparison between inputs or more than six inputs to each set may be used to obtain such comparison by contraction or by expansion of the relay chain as appropriate.

Thus upon receipt of two inputs, with one input from each of its two cycle selectors, the selector unit of the present invention will determine the relation between the two opposing inputs. Preferably the same number of inputs, thus the same number of segments or steps of opposing scales, would be provided for each cycle selector apparatus with the inputs from the respective cycle selector apparatus applied to opposite banks or chains of relays of the selector unit with each input of each cycle selector unit applied to and controlling one relay in the associated bank or chain of relays respectively.

Relation between the opposing energized inputs with respect to their position on their respective scale, may be expressed as an output from the selector unit in a combination of energized and/or deenergized output leads which may be used to control relays or other circuitry and may be provided as an output for master control of traffic control system.

If two different traffic flows, inbound, for example, and outbound, for example, are detected through actuation of vehicles in the respective traffic flows themselves, a traffic characteristic individual to each traffic flow, such as volume of inbound traffic for example, and volume of outbound traffic for example, may be measured and determined individually and each value calibrated with respect to a segmented scale of traffic volume for that particular traffic flow. Two outputs, each representing a segment of a segmented scale of traffic volume, may be applied to opposing banks of relays of a selector unit. Thus since each output of each respective cycle selector represents a value of a traffic characteristic and the relation between the outputs may be determined by and represented by a final output, of the selector unit, it may be said that the final output of the selector unit represents the relation between the two traffic characteristics themselves.

An output from the selector unit may be provided so that when the volume of inbound traffic is substantially equal to the volume of outbound traffic thus providing energization of corresponding inputs to the selector unit and applied to opposing relay banks, the output of the selector unit will represent balanced or average traffic conditions on the roadway and when the volume of inbound traffic exceeds the volume of outbound traffic, as expressed by the energized input representing inbound traffic being higher in its scale than the energized input representing outbound traffic, the output of the selector unit may represent inbound preferential traffic conditions on the roadway and when the volume of outbound traffic exceeds the volume of inbound traffic, as expressed by the input representing outbound traffic being higher in its scale than the input representing inbound traffic, the output of the selector unit may represent outbound preferential traffic conditions on the roadway.

The improved selector unit, unique in its simplicity of symmetrical sets of circuits interconnected between two chains of multiple relays, provides selected outputs which may represent relative conditions on a roadway. Similar outputs which have been used to represent similar traffic conditions or traffic relations have heretofore been obtained from more complex electronic circuitry than is herein proposed in the present application.

Since the output of the selector unit may represent traffic conditions on the roadway, that is, the relation between two traffic characteristics on the same roadway, the several output combinations of the selector unit may be used to select different traffic plans from a selection of several traffic plans of one or more local traffic controllers in a traffic control system for expediting the flow of traffic along the roadway, selection of a traffic plan from several traffic plans may include the selection of a split or division of a traffic signal cycle or the selection of the offset of one traffic signal cycle with respect to the traffic signal cycle of an adjacent controller or the combination of the two, selection of the split of a traffic signal cycle and, at the same time, selection of a desired offset between adjacent local controllers, as part of the same traffic plan.

Since the output of the selector unit may represent relative traffic conditions on a roadway such output may be used as the output for master control of lane changing apparatus such as that disclosed in my said copending application Serial No. 27,605. My said copending application disclosed means responsive to outputs representing relative traffic conditions on a roadway, for controlling the direction of traffic flow over reversible lane or lanes, or a part thereof, so as to provide for additional travel space for substantially heavy traffic flow during the periods when the opposing traffic flow is substantially lighter in volume, for example.

From another aspect the improved selector unit may be employed in a master controller in which two electronic cycle computers are employed to provide two scales of segmented outputs which may serve as inputs for application to the present selector unit.

The selected output from the electronic cycle computer may represent a measurement of traffic characteristic similar to that described above, so that the output from two electronic cycle computers may provide the inputs of two different traffic characteristics to opposing banks or chains of relays of the present selector unit. Each electronic cycle computer may be similar to that taught by John L. Barker in his U.S. Patent 2,932,003 issued April 5, 1960, under the title "Electronic Cycle Computer," for example.

The said U.S. Patent 2,932,003 discloses an electronic cycle computer device which provides selection from among six potential outputs where each output may represent a measurement within a segment of measurements of the segmented scale. Thus the six potential outputs of the electronic cycle computer of the said Patent 2,932,003 may compare with or may be similar to the six potential outputs of the cycle selector in the said Patent 2,288,601.

Thus in accordance with a further aspect of the present invention, a novel master controller of a traffic control system is presented which includes at least two electronic computers, each with one or more associated vehicle detection means for providing means for counting or measuring traffic characteristics, a selection unit for receiving a scaled output from each of the two electronic computers and a delayed timer circuit which receives the output from the selector unit such output representing the relation between the outputs of the two electronic computers. The delayed timer circuit may itself provide an output which represents traffic conditions on the roadway, which output may be the output of a master controller for a traffic control system, which output having once changed may not again change before the expiration of a predetermined time.

Since the electronic cycle computer is designed to respond rapidly to rapid and radical variations of traffic conditions if such radical changes in traffic conditions should occur, such radical changes would be reflected by the outputs of the respective electronic cycle computers and the comparison between such outputs made by the selector unit would reflect the various changes in relative traffic conditions as they occur.

This potentially varying output of the selector unit may be used as the output of a master controller of a traffic control system and may be applied to various local controllers for partial control of the splits and offsets for example, of the individual local controllers, however, in the preferred form, the delayed timer circuit is provided, which delayed timer circuit may be in the form presented below, to provide a more stable and constant output to the local controllers in the traffic control system.

It is an object of the invention to provide an improved master controller for control of a traffic control system in which an improved selector unit is included for comparing between two segmented scale inputs applied to such selector unit by two traffic cycle selectors or traffic measuring devices for providing a selected output from the master controller for control of certain functions of one or more local traffic controllers in the traffic control system.

Another object is to provide an improved selector unit for use in a controller, such as a master controller, of a traffic control system, for receiving at least two potentially varying inputs individually representative of at least two different traffic characteristics and providing therefrom an output which may represent the relation between the traffic characteristics.

It is another object of the invention to provide an improved selector unit for comparing at least two measurements from two different segmented outputs in which comparison is made by the use of two banks of relays having chain relay circuits, where one bank of relays responds individually to one set of inputs and the other bank of relays responds to the second set of inputs with sets of interconnected symmetrical circuits between the two contacts of opposing banks of relays providing an output representing the relation between two opposing measurements.

A further object of the invention is to provide an improved selector unit in which response to various differentials between inputs is selected by switching means which uniformly changes the symmetrical circuits between the relay contacts of two banks of relays.

Another object is to provide a selector unit for comparing between energized relays of two opposing banks of relays, each bank corresponding to a segmented scale, with interconnecting symmetrical multirelay control circuits providing an electrical output which may represent the comparison determined.

Another object is to provide an improved selector unit for comparing between segmented inputs with selection for providing adjustment of an allowable differential between opposite inputs for selected outputs.

A further object is to provide a novel delayed timer circuit for controlling selection among multiple outputs in response to changes among multiple inputs for providing an output which may be changed to conform to an input into the delayed timer circuit but once having changed its output to conform with such input, to maintain such output unchanged for at least a predetermined time.

Another object is to provide an improved selector or comparison unit for comparing the relation between two inputs with respect to the position of each input relative to a graduated multiposition or step scale of values in which selection may be made to provide an output indicating that the inputs substantially correspond with each other when the inputs are corresponding only, or the inputs may be corresponding or non-corresponding but are not more than one position apart; or when the inputs may be corresponding or non-corresponding but are not more than two positions apart.

FIG. 1 represents in block form a plan view of an actuated traffic control system of the master-local type with the master controller responding to traffic actuation and providing an output to the local controllers of the traffic control system, one of which is represented by the block TC.

By way of illustration a two way street, Street A, is shown extending along the top of the figure with an intersecting street, Street B, on the right side of the figure. The Street B may be a one way street or a two way street. The arrows in the lanes of Street A indicate the direction of traffic flow along the respective lanes of Street A.

For purpose of description and convenience of reference traffic in the upper lane of the diagram shall be referred to as inbound traffic and traffic in the lower lane of the diagram shall be referred to as outbound traffic, although such traffic flows could be designated with compass names or other descriptive terms.

The intersection of Street A and Street B is illustrated as being controlled by traffic signals, generally represented as SL.

The traffic signals SL are generally represented as being controlled by a local traffic controller, generally represented as a block TC. It should be understood that the block TC merely represents local traffic controllers in general, and that block TC may represent a local traffic controller generally used for the purpose of controlling right of way, of traffic at an intersection in which selection of certain controls of the local traffic controllers may be made.

Figure 1:
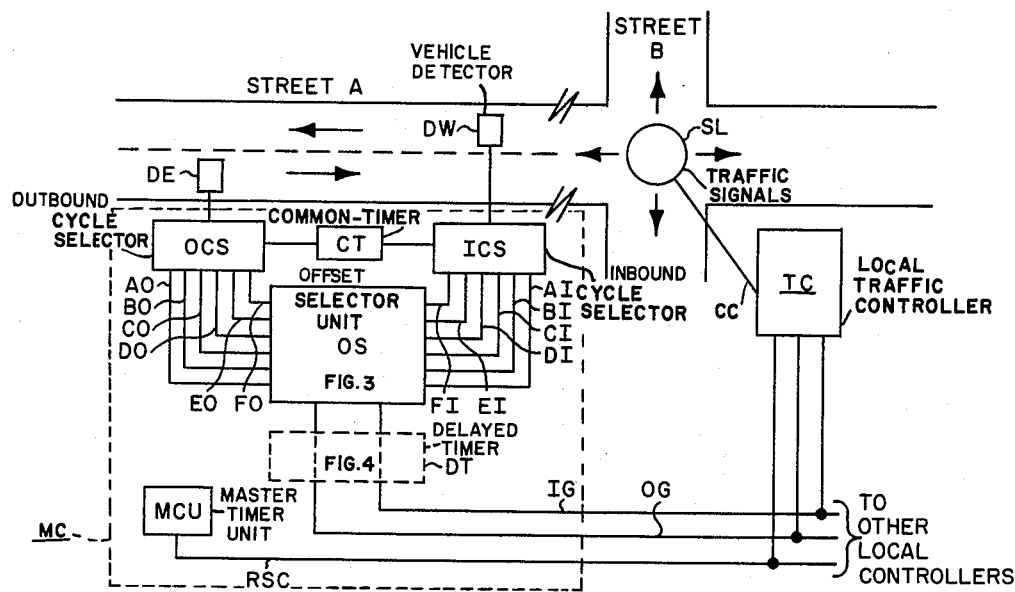
FIG. 1 represents a plan view of a traffic actuated master-local traffic control system, the traffic control system being represented in block form.
Figure 2:
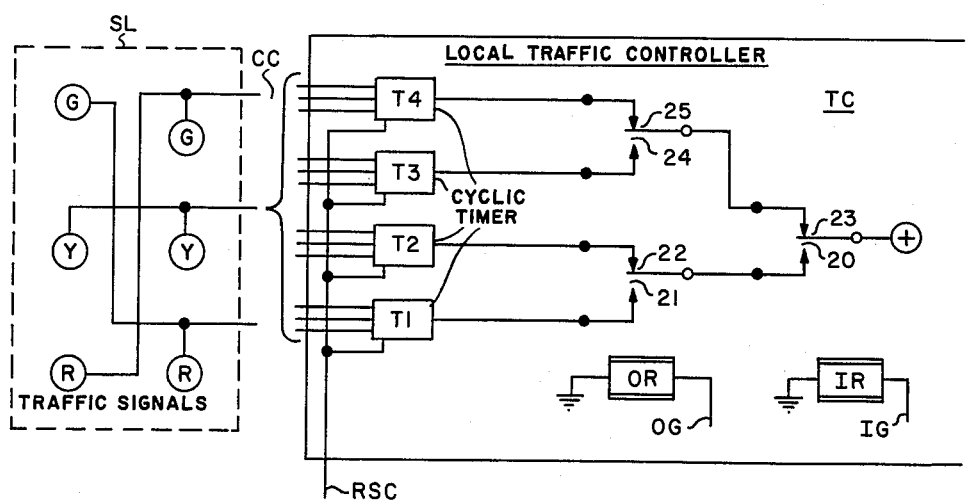
FIG. 2 represents, partly in block and partly in simplified circuit form certain of the interior of a local traffic controller so as to illustrate one way in which certain operations of the local traffic controller may be controlled by a master controller.

FIG. 2 below may illustrate part of one form of such type local controller while John L. Barker in his U.S. Patent Number 2,542,978 issued February 27, 1951 under the title "Traffic Actuated Control Apparatus" discloses several other forms of local controllers which may also be represented by block TC in FIG. 1 herein.

Within the broken line box MC, one type of master controller is represented which controls certain of the operations of one or more local traffic controllers in the traffic control system. As for example, the present master controller may be used to provide an output via the lines IG, OG, and RSC extending from the master controller to each of the local traffic controllers in the system, to control the offset between the local traffic controllers or may be used to select a cyclic timing device from two or more cyclic timing devices, in one or more of the local traffic controllers in the traffic control system.

The master controller represented in FIG. 1 may include vehicle detection devices for detecting individual characteristics of a traffic flow along Street A. Such vehicle detecting devices may be represented by or may be part of the block DW employed for detection of inbound traffic and may be part of the block DE employed for detection of outbound traffic, individually, in the respective lanes. The block DW may also include a traffic characteristic counting or measuring device which, for example, may measure the volume of inbound traffic on the Street A while the block DE may include a traffic characteristic counting or measuring device, which, for example, may measure the volume of outbound traffic on the Street A. It should be understood that the vehicle detecting devices included as part of the block DW and/or part of the block DE could be any of the familiar vehicle detectors either mechanical, electrical or electronic, which may be sensitive to pressure, radiant-energy, magnetism or light.

Assuming that both the block DW and DE represent traffic volume measuring devices the block DW may feed traffic volume information for example to a block OCS while the block DW may feed traffic volume information to a block ICS. This information need not necessarily be traffic volume information but may be or may represent information of various traffic characteristics.

For purposes of illustration, and without limitation, it shall hereinafter be assumed that the information from the blocks DW and DE respectively is in the form of an electrical output initiated by a vehicle actuation of vehicles in the traffic flow which electrical output may be in such form so as to individually derive traffice volume information therefrom with respect to the traffic flow actuating such device.

Block OCS and the block ICS may each represent a cycle selector, each of which may be similar to a cycle selector fully described and illustrated in the said U.S. Patent 2,288,601.

As more fully disclosed in the said U.S. Patent 2,288,601 a cycle selector may receive inputs in the form of individual voltage pulses which may be derived through actuation of vehicle detecting devices by vehicles in the traffic flow and the cycle selector may in effect measure or count the pulse input received over a period of time so as to measure the volume of pulses received per unit time and determine the volume of traffic flow over such a period of time. Such cycle selector is arranged to affect a choice from six or more steps or cycles of a graduated scale where the step may represent a calibrated or graduated step or value of a scale of steps or values of a traffic characteristic, as for example, the volume of a flow of traffic on a roadway. The scale may be divided into six or more steps, as desired, and after a time period, during which the measuring or counting occurs, the cycle selector decides which step of the graduated scale the measure or count corresponds to and energizes an output corresponding to such step.

Accordingly the six output leads of OCS are represented as AO, BO, CO, DO, EO and FO extending between the block OCS and the block OS and the six output leads of ICS are represented as AI, BI, CI, DI, EI and FI extending between the block ICS and the block OS.

Thus, both inbound and outbound traffic flows on the Street A are individually measured over substantially the same time period, such time period being controlled by a common timer represented by block CT which common timer may be similar to that disclosed in the said U.S. Patent 2,288,601, and at the end of such time period each cycle selector energizes one of its respective output leads so that two leads, one lead from each group of six leads, that feed into the block OS, are energized.

Figure 3:
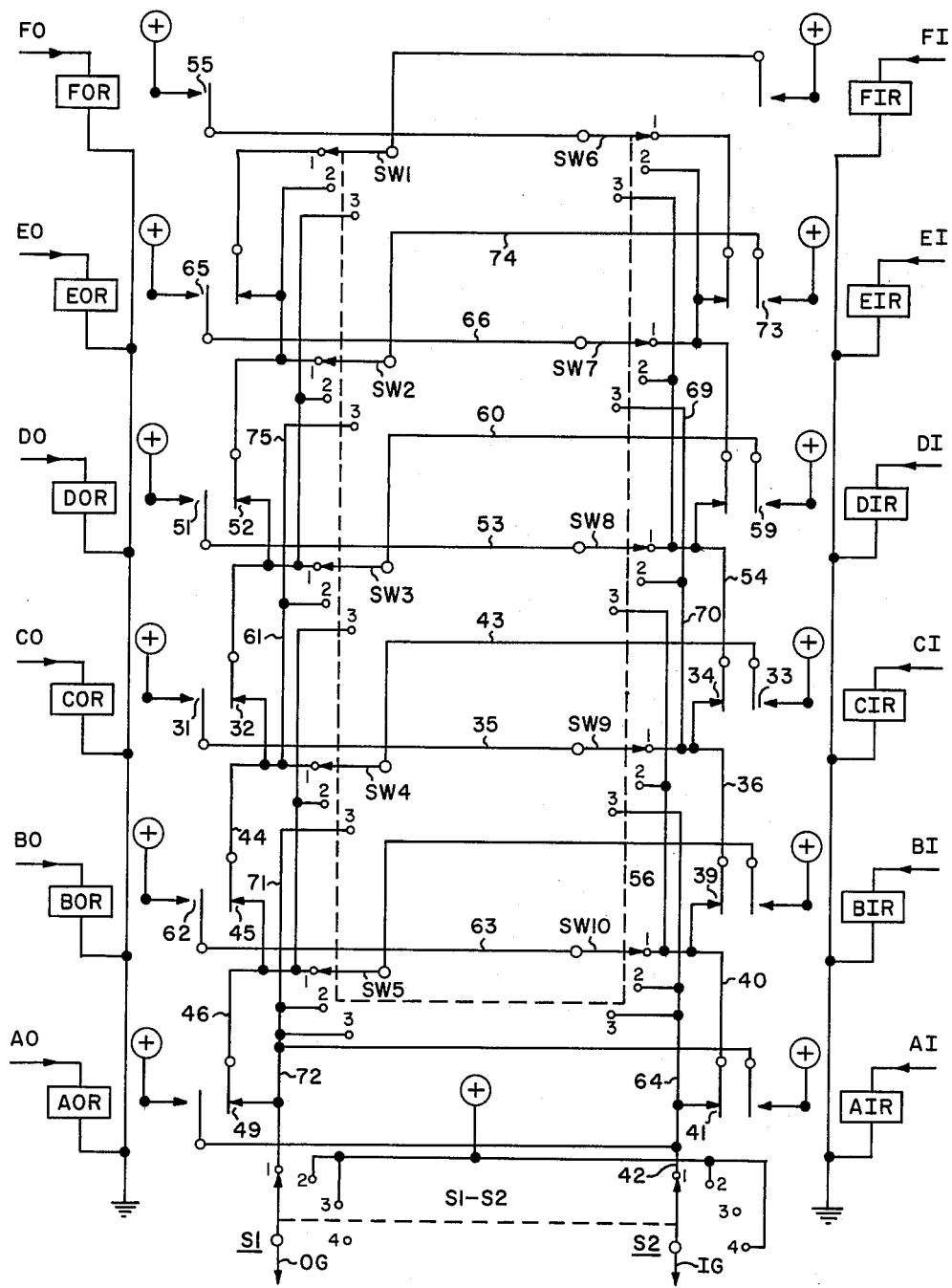
FIG. 3 illustrates, in schematic circuit, form, the preferred form of improved selector unit.

The block OS represents an offset or selector unit which is illustrated in its preferred form in a circuit diagram in FIG. 3 herein. The offset or selector unit, herein referred to as selector unit, is represented as having twelve inputs, two sets of six inputs each, with each input connected to and controlling a relay in a chain or bank of relays.

According to the preferred form, as illustrated in FIG. 3, one relay at a time in each bank is energized, each relay in each bank corresponding to a step or a cycle in a graduated scale of steps or cycles where the bottom relay on each bank of relays may correspond to the lowest step or cycle in a scale of steps or cycles with each relay above corresponding to a progressively higher step or cycle, and the relay on top of the bank corresponding to the highest step or cycle of the graduated scale.

The output of the block OS is representative of the relation between the two inputs from the respective cycle selectors with respect to their respective scale. Thus the output of the selector unit may represent the relation between inbound traffic volume and outbound traffic volume on Street A, so long as the respective outputs of the respective cycle selectors ICS and OCS represent measurements of individual traffic volumes of the inbound traffic flow and the outbound traffic flow respectively. For example, cycle selector OCS may, at the end of a time period, energize the second step or lead BO in its scale and cycle selector ICS, at the end of the same time period, may energize its second step or lead BI in its scale. Assuming both scales are substantially the same, energization of corresponding steps may indicate substantially balanced or equal volumes of traffic flow on Street A and thus the selector unit OS comparing such energized steps, will provide an output by energizing both leads IG and OG indicating a balanced or average relationship between the energized steps of the two scales or such indication may indicate balanced or average traffic conditions on the Street A.

If, for example, OCS should energize this fifth step, EO, and ICS should energize its second step BI, in their respective scales at the end of the same time period, the energization of the non-corresponding steps may indicate higher outbound traffic volume than inbound traffic volume on the Street A and the comparison of the two non-corresponding steps by the selector unit will cause energization of lead OG and deenergization of lead IG thus indicating that the step energized by OCS is higher in its respective scale than the step energized by ICS relative to its respective scale, or such output by the selector unit may indicate that traffic conditions on the Street A, were such that outbound traffic volume was more excessive than inbound traffic volume during the past timed period.

If cycle selector OCS should, for example, energize its second step BO, and cycle selector ICS should, for example, energize its fifth step, EI, in their respective scale, which may indicate higher inbound traffic volume than outbound traffic volume on Street A, then comparison by the selector unit will cause energization of lead IG and deenergization of lead OG thus providing an output indicating that the step energized by ICS is higher in its respective scale than the step energized by OCS relative to its respective scale, and that traffic conditions on the Street A during the past timed period, were such that in the inbound traffic volume was more excessive than the outbound traffic volume on the Street A.

Of course although the steps of the respective cycle selectors may be similar and the scales and/or steps may correspond each to the other, it is not necessary that the scales or the steps correspond. However, in the preferred form the same number of steps are provided in each scale.

The leads IG and OG from the selector unit, block OS, may represent output leads from the master controller, MC, which extend to the several local controllers of the traffic control system through which certain control by the master controller is exerted over the local controllers, such as the control of offset between adjacent local traffic controllers or selection between different cycle timers of the several local controllers in the traffic control system.

The block MCU, may represent a master cycle unit which as part of a master controller provides a resynchronizing or coordinating circuit which may extend to all the local controllers in the traffic control system from the master controller via the lead RSC. This resynchronizing or coordinating circuit may control synchronization of the local controllers within the traffic control system and coordinate all the individual local controllers one with the other to assure prompt resynchronization in the event that individual local controllers get out of step temporarily as a result of a failure or the like. One form of master cycle unit is taught by John L. Barker in his said U.S. Patent 2,542,978.

The local traffic controller represented by block TC, is represented as controlling illumination of a traffic signal represented by SL, via cable connection represented by the lead CC.

It should be understood that a ground return may be required to complete the circuit between the multiple components of the master controller itself and/or between components in the entire traffic control system. This ground return line has been eliminated for convenience and for simplification of the drawing.

An alternate form of master controller may include the use of two electronic cycle computers each similar to that disclosed and taught by John L. Barker in his said U.S. Patent 2,932,003, which would each select and energize an output from multiple outputs which may be applied to a selector unit. The output of an electronic cycle computer of the said U.S. Patent 2,932,003 may be similar in some respects to the output of the cycle selecting apparatus of the said U.S. Patent 2,288,601, in that multiple outputs arranged in steps of a graduated scale may be potentially provided with the energized lead or output of the electronic cycle computer corresponding to a measurement of the scale. The selector unit may be associated with a delayed timer circuit for providing an output to the local controllers of the traffic control system which output may be the output of the master controller.

Such alternate form of master controller may be represented in block form where the block OCS represents one electronic cycle computer and the block ICS represents a second electronic cycle computer with OCS associated with the block DE for the combined sensing of the outbound traffic volume on Street A and with ICS associated with the block DW for combined sensing of the inbound traffic volume on Street A, for example.

As more fully disclosed in his U.S. Patent 2,932,003 an electronic cycle computer may be employed to provide one energized output from a selection of multiple outputs in response to traffic actuation, the energized output representing a value or step in a graduated scale of values or steps which may include six potential outputs. The output of the electronic cycle computer however is representative of current traffic conditions in the traffic lane or lanes from which traffic actuations are being received, since the electronic cycle computer reacts and follows the current trends of traffic. The count or measurement of the traffic characteristic by an electronic cycle computer is not accumulated over a period of time with a determination to be made at the end of the time period. Thus, this more advanced electronic cycle computer is less limited and has no specific sampling time period as that described in the cycle selector apparatus of the earlier U.S. Patent 2,288,601.

Since the more advanced form of the electronic cycle computer requires no timer, in the alternate master controller, including the electronic cycle computers, the common timer, block CT, would be eliminated. However, to insure that the output of the master controller to the individual local controllers remains substantially constant for a period of time and to prevent closely spaced short lived changes in output of the master controller due to sudden and radical short lived changes in the traffic characteristic measured, the outputs IG and OG of the selector unit, may be applied to a delayed timer circuit which may be represented in FIG. 1 by a broken line block DT.

Figure 4:
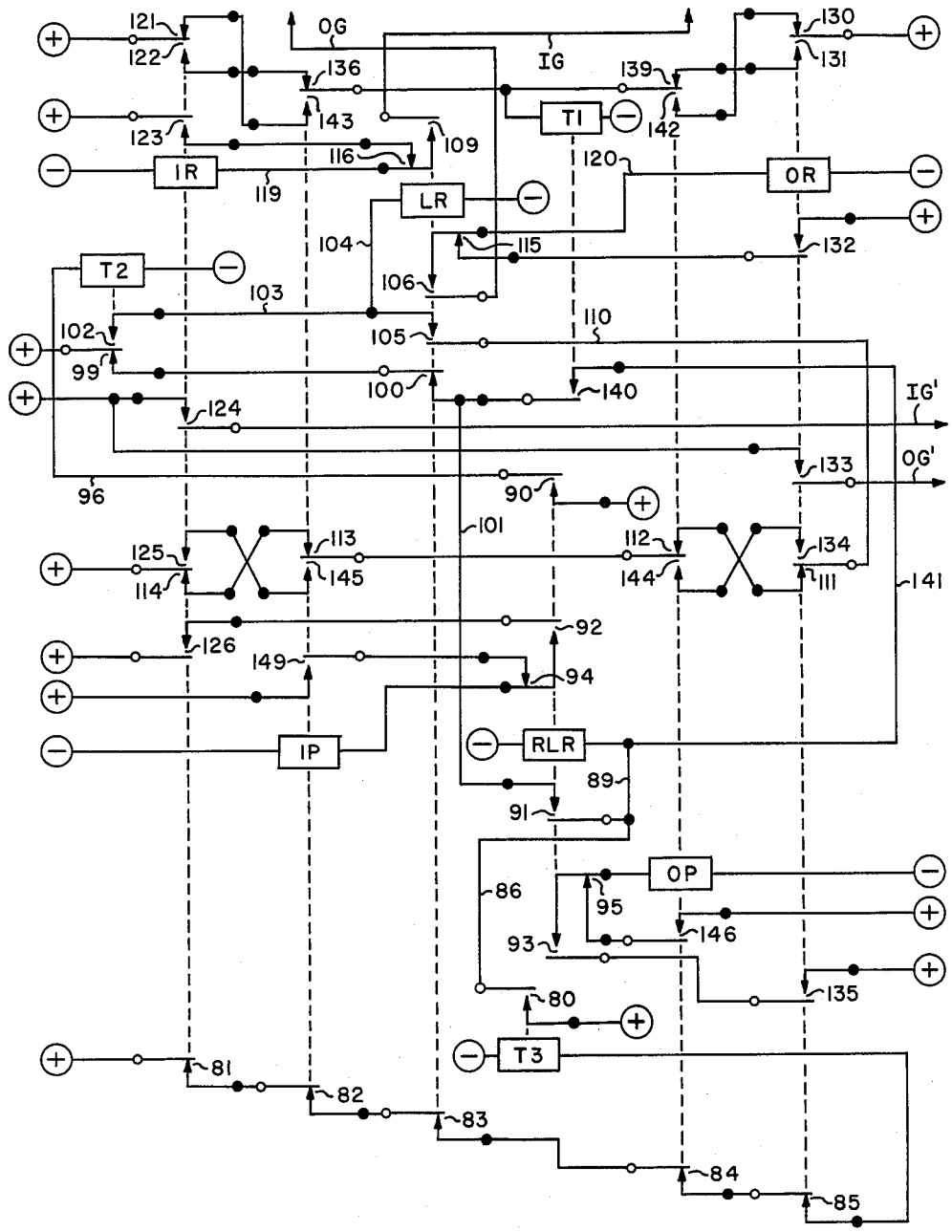
FIG. 4 illustrates, in schematic circuit form, the preferred form of a delayed timer circuit for association with the improved selector unit in an alternate form of improved master controller.

On certain types of traffic control system it is desired to avoid closely spaced output changes by a master controller. Therefore associated with such master controller it maybe desired to provide a delayed timer circuit such as the type disclosed herein, for example. Such delayed timer circuit provides a means whereby an output of the master controller may be applied to the several local controllers of the traffic control system and such output held for at least a minimum time period during which a new output change may not be made. The circuitry of the preferred form of delayed timer circuit is illustrated in FIG. 4 and described below with reference thereto.

Generally the output of the delayed timer circuit may be conformed with the output of the selector unit, block OS. Upon conforming the output of the delayed timer circuit with the output of the selector unit, after a change in output by the selector unit, the delayed timer circuit severs itself electrically from the output of the selector unit for a timed period of the order of 2 to 6 minutes, for example, during which time the output of the delayed timer circuit my not be changed. The conformed output of the delayed timer circuit would be maintained over this minimum period and would be applied as part of the output of the master controller to the several local controllers during such timed period. During the period of electrical severance between the delayed timer circuit and the selector unit the output of the selector unit may vary and follow current traffic trends without any effect on the output of the delayed timer circuit. After a timed period, the delayed timer circuit will check back by reconnecting itself to the output of the selector unit and if necessary again change its output to conform its output with the output of the selector unit. If a change of output is required by the delayed timer circuit so as to make its output conform with the output of the selector unit, such change will be made and the delayed timer circuit will again sever its electrical connection with the selector unit and maintain such conformed output constant, for an additional timed period.

At termination of the timed period, electrical reconnection between the delayed timer circuit and the selector unit will be made, again permitting a change of output by the delayed timer circuit.

If such change is not then necesary, as for example, if the output of the delayed timer circuit and the output of the selector unit conform, then the electrical connection between the delayed timer circuit and the selector unit will be maintained and upon a subsequent change of output by the selector unit and delayed timer circuit will change its output to conform with the output of the selector unit, sever the electrical connection between the input to the delayed timer circuit and the output of the selector unit after conforming its output and commence timing an additional period during which the output of the delayed timer circuit may not change.

As described in the U.S. Patent 2,288,601, the cycle selector apparatus advances step by step per each sampling time period commencing operations at its lowest represented output and advancing one step for such sampling time period until the output of the cycle selector represents the traffic characteristic having been measured over the last preceeding time period. If when the cycle selector apparatus is first turned on traffic is very heavy or would be represented by, for example, the fifth step or cycle in the outputs of the cycle selector, such cycle selector apparatus would require four sampling time periods to step from the first or one cycle position to the fifth or five cycle position. This may require an amount of time which would be 4 times the length of the timed period sampling. On the other hand the more advanced electronic cycle computer of U.S. Patent 2,932,003 provides a more flexible device which may follow current traffic trends without the necessity of sequentially advancing step by step or accumulating a count or measurement over the period of time, and thus provides an output that more faithfully represents current traffic trends by providing a more radical and rapid change of cycle position output.

Thus although the output of the alternate form master controller is maintained constant over a timed period the output is capable of radical changes at the end of each timed period.

Referring to FIG. 2 certain of the circuitry that may be found in one type of local controller, represented by block TC of FIG. 1, is illustrated in simplified circuit form and block form, with one means for controlling part of the operation of a local controller by external control, represented. The leads OG and IG, which are connected to the relays OR' and IR' respectively, represent extensions of the leads OG and IG which represent certain of the control lines of a master controller, are identically labeled to corresponding leads in FIG. 1. Also the lead RSC is illustrated extending to the local controller representing certain other control lines from the master controller, also illustrated in FIG. 1 and identically labeled.

As previously described during substantially balanced traffic conditions both leads IG and OG will be energized, providing one combination of outputs from the master controller to the several local controllers. With unbalanced traffic conditions, as when the inbound traffic exceeds the outbound traffic, the lead IG will be energized and the lead OG will be deenergized. Energization of lead OG and deenergization of lead IG, a third combination of outputs, indicates unbalanced traffic conditions with the outbound traffic in excess of the inbound traffic. If due to a failure or otherwise the master controller is caused to lose its power and/or not function, then both leads OG and IG would be deenergized thus providing a fourth combination of outputs all of which may be applied from the master controller to the local controllers of the traffic control system for partial control of the local controllers.

Thus the combination of the conditions of the two leads IG and OG from the master controller, which may represent traffic conditions on a roadway, may provide partial control of the local controllers by, for example, selecting between different predetermined traffic plans from several traffic plans within the local traffic controller each plan of which may control selection of different splits of traffic signal cycle or may select between different offsets of the signal cycle between adjacent local traffic controllers in the traffic control system all in accordance with the condition of the traffic detected.

The aforementioned John L. Barker Patent 2,542,978, illustrate several types of local traffic controllers which may, by master control or otherwise, provide one traffic plan from several traffic plans, with remote selection as desired. The said Barker patent illustrates other forms of control which may be associated with a local controller and controlled by a master controller such as coordination of change of split or coordination of change of offset such changes being made in a precise part of time of the time cycle. The present illustration of a local traffic controller provides an extremely simplified form of traffic plan selection by a master controller. It will be understood by those skilled in the art that although a change of selection of traffic plan may be made, means may be provided so that such change may only become effective at or during a certain part of the cycle as predetermined. One such type of means is illustrated in the said U.S. Patent 2,542,978.

By way of illustration four boxes T1, T2, T3 and T4 are illustrated inside the block TC, each of the four boxes being representative of a means of providing a separate traffic plan. For example, each box T1, T2, T3 and T4 may represent separate cyclic timing means, each of which may be separately adjusted so that the distribution or split of the time of one traffic signal cycle may be made individually as desired. Thus four different splits of the time of a traffic signal cycle may be available, each depending upon the setting of the cyclic timing means, and each of which would individually control the set of traffic signals SL, through the cable connection CC upon selection, as desired. The boxes T1, T2, T3 and T4 may also represent cyclic timing means which may be adjusted so that the start of the individual traffic signal cycle may be adjusted as desired, so as to offset the start of one traffic signal cycle of one local controller from the start of the traffic signal cycle of an adjacent local controller and thus change the offset of the signal cycle between controllers as desired, through selection of one of the several boxes.

As illustrated, selection of one of the several boxes T1, T2, T3 or T4 may be made through control of the relays OR' and IR', which relays are controlled by the output leads OG and IG respectively from the master controller.

Since the conditions of the leads IG and OG depend upon and represent traffic conditions on a roadway, the several cyclic timing means may be adjusted to each provide a different split of the time cycle or offset between adjacent local controllers or both, as desired, so that under certain traffic conditions, which conditions will be reflected by energization or deenergization of the leads IG and OG, selection of a traffic plan best suited for the prevailing traffic conditions may be made.

For example, with both leads IG and OG energized, indicative of average or balanced traffic conditions, the relays IR' and OR' will both be energized. Relay OR' will close its contacts 21 and 22 and relay IR' will close its contact 20, thus providing positive power, represented by a plus in a circle, to the cyclic timer T1 via contacts 20 and 21 so as to make operative cyclic timer T1 and hold T2, T3 and T4 inoperative. Thus the cyclic timer T1 may be adjusted to provide a split of the time cycle and/or offset of the signal cycle for the most efficient use of roadway facilities for average or balanced traffic on the Street A for example.

With the leads IG energized and OG deenergized indicative of heavy inbound traffic and relatively lighter outbound traffic, the relay IR will be energized and the relay OR' will be deenergized. The relay IR' will hold its contact 20 closed while relay OR' will release contacts 21 and 24 and close its contacts 22 and 25 thus providing positive power to cyclic timer T2 via contacts 20 and 22 so as to make cyclic timer T2 operative and hold T1, T3 and T4 inoperative. Thus a cyclic timer T2 may be adjusted to provide a split of the time cycle and/or offset of the signal cycle for the most efficient use of roadway facilities for heavy inbound traffic and lighter outbound traffic conditions on Street A, for example.

With output leads OG energized and IG deenergized and indicating heavy outbound traffic and relatively lighter inbound traffic the relays OR' and IR' will be energized and deenergized respectively. The relay OR' will close its contacts 21 and 24 and relay IR' will close its contact 23 thus providing positive power to cyclic timer T3 via contacts 23 and 24 so as to make cyclic timer T3 operative and hold T1, T2 and T4 inoperative. Thus cyclic timer T3 may be adjusted to provide a split of the time cycle and/or offset of the signal cycle for the most efficient use of roadway facilities for heavy outbound traffic and relatively light inbound traffic on Street A, for example.

With both output leads IG and OG deenergized as illustrated, which condition may indicate that the power in the master controller has been turned off, or there has been a loss of power, the relays IR' and OR' would both be deenergized. The contacts 23 and 24 would be closed to provide positive power to cyclic timer T4 so as to make cyclic timer T4 operative via a local power source, for example, and hold T1, T2 and T3 inoperative. This condition may provide "free" or independent operation of the local controllers and thus T4 may be adjusted to provide a split of the time cycle and/or offset of the signal cycle for "free" operation, as desired.

The lead RSC from the master controller, for control of synchronization of the local controllers, one with the other, is illustrated as being connected to each cyclic timer means. This circuit may control a relay or other device employed to synchronize the cyclic timing means of the several local controllers or may be connected to a device as illustrated in the said U.S. Patent 2,542,978 for synchronized control of the local controllers as, for example, by keeping the several local controllers in step with the master controller, as provided by the representation by the box MCU in FIG. 1. The box MCU in FIG. 1 for example, may be similar to a master control unit of the type disclosed by John L. Barker in his said U.S. Patent 2,542,978.

Although the lead RSC is illustrated as connected to cyclic timing means T4, which cyclic timer may be used during "free" or independent operation of the local controllers, it may be desired to release the individual local controllers for coordinated or synhcronized control during "free" operation. Thus, the lead RSC would be disconnected from the cyclic timer T4 and only connected to the other cyclic timing means in the several local controllers.

From each of the cyclic timing means T1, T2, T3 and T4 three leads are extending to the outside of the block TC. Each group of three leads represents a cable connection through which the signals SL may be controlled. Of course there may be a greater or smaller number of leads included in each cable connection depending upon the number of signals or lamps in the traffic signal head SL. The present system illustrates one of the more simple type of signal lamp systems where the red (R) signal of one street and the green (G) signal of the other street of the intersecting roads are illuminated in common so as to permit traffic flow along one street while prohibiting traffic flow along the other and the yellow (Y) signals of both roadways, for caution, are illuminated in common. Obviously other types or local controllers and/or other signal lamp combinations may be employed in the system.

It will be obvious to those skilled in the art that each group of cable connections extending from the cyclic timing means to the signal lamps may be electrically isolated from each other by isolating relays and contacts or by isolating diodes or other means, to prevent electrical feedback between cyclic timers.

Referring now to FIG. 3 the circuit diagram of the selector unit, which may be represented by the block OS in FIG. 1, is presented in its preferred form with two groups of six input leads each, AO through FO on the left and AI through FI on the right. These leads may represent the input leads into the selector unit that are represented in FIG. 1 as extending between the cycle selector OCS and selector unit OS, and the cycle selector ICS and selector unit OS, respectively, as illustrated in FIG. 1 and identically labeled.

In the preferred form of selector unit, each of the inputs may individually represent a predetermined segment of measurements of a segmented scale of a measurable factor and each input in one group of leads AO, BO, CO, DO, EO, and FO may represent one segment each of the segmented scale with lead AO representing the lowest segment of measurements of the scale and lead FO representing the highest segment of measurements of the same scale.

A second group of inputs, which may individually represent predetermined segments of another segmented scale, may be applied to the selector unit with the leads AI, BI, CI, DI, EI and FI each representing a segment of measurements of the segmented scale with AI representing the lowest segment of measurements of the second scale and FI representing the highest segment of measurements of the second scale.

It should be understood that although the preferred form of selector unit is illustrated and provided with two groups of six input leads each which may be from each of two cycle selectors with the leads AO and AI of the respective cycle selectors OCS and ICS representing the lowest segment of the segmented scale and the leads FO and FI representing the highest segment of the segmented scale of the respective cycle selectors, the value of the individual inputs into the selector unit may be inverted so that the AO and AI leads may represent the highest segment and the FO and FI leads may represent the lowest segment with the input leads between the respective high and low inputs inverted correspondingly.

The six input leads making up one full scale of inputs AO through FO from the cycle selector OCS and the six input leads making up one full scale of inputs AI through FI from the cycle selector ICS may be the six inputs from a cycle selector which may be similar to that illustrated and described in the said U.S. Patent 2,288,601, for example. The two graduated scales are preferably graduated into the same number of segments but corresponding segments of different scales need not cover corresponding sections of the opposite scale.

As for example, the inputs AO through FO may represent the volume of traffic flow, in vehicles per hour, on a roadway in which two traffic lanes are allocated for use of one directional flow of traffic and where the lowest volume of traffic may approach zero vehicles per hour and the highest volume of traffic may reasonably be eighteen hundred vehicles per hour. Thus the scale of traffic volume for two lanes of traffic may cover zero vehicles per hour to eighteen hundred vehicles per hour over six positions of a segmented scale where the six inputs AO through FO, for example, represent six segments with each segment representing a range of measurements including three hundred vehicles per hour, for example.

The other group of six inputs AI through FI may represent the volume of traffic flow in vehicles per hour on a roadway or the same roadway, in the opposite direction with only one lane allocated to that directional flow of traffic, where the lowest volume of traffic may approach zero vehicles per hour and the highest volume of traffic may reasonably be nine hundred vehicles per hour. The scale of traffic volume for one lane of traffic may then cover zero vehicles per hour to nine hundred vehicles per hour over the six positions of the segmented scale where the six inputs AI through FI, for example, may reach represent a range of measurements including one hundred fifty vehicles per hour, for example.

If, for example, the factors measured are of two separate traffic characteristics, as for example, the volume of inbound traffic flow and the volume of outbound traffic flow on the same roadway, and two inputs, one representing the volume of inbound traffic flow and the other representing the volume of outbound traffic flow are applied to a selector unit, comparison may be made between the two inputs or the two traffic volumes, for example, and an output representing such comparison may represent relative traffic conditions on the roadway.

The selector unit is provided with a two pole four position ganged switch, S1–S2, for example, for selection of various modes of operation including position #1, the illustrated position, in which a variety of outputs of the selector unit are automatically provided according to the comparison of the energized inputs. If, for example, corresponding inputs to the selector unit are energized, indicating substantially balanced traffic volume then the output leads IG and OG will both be energized which may represent balanced traffic conditions. If, for example, the energized inputs to the cycle selector representing inbound traffic volume is higher in its scale than the energized input representing outbound traffic volume then the output lead IG will be energized and the output lead OG will me deenergized which may represent inbound preferential traffic conditions. If, for example, the energized input to the selector unit representing outbound traffic is higher in its scale than the energized input representing inbound traffic volume then the output lead OG will be energized and the output lead IG will be deenergized which may represent outbound preferential traffic conditions. If, for example, there are no energizing inputs into the selector unit, both output leads IG and OG will be deenergized which may represent "free" or independent operation of the several local controllers when the selector unit is included as part of a master controller in a traffic control system.

These several outputs of a selector unit are automatically provided according to the comparison made of the energized inputs into the selector unit.

Moving the switch S1–S2 into position #2 removes the output of the selector unit for automatically response to comparison and provides a fixed output representing balanced traffic conditions without regard to the actual relative positions between the energized inputs.

With the switch S1–S2 in position #3 a fixed output representing outbound preferential traffic conditions is provided and by placing the switch S1–S2 in position #4 a fixed output representing inbound preferential traffic conditions is provided, regardless of the actual relation between the energized inputs into the selector unit.

The preferred circuit is further provided with a set of ten ganged single pole three position switches SW1 through SW10, which may be manually adjusted, for providing various degrees of comparison between the inputs.

As for example with the ganged switches SW1 through SW10 in position #1 as illustrated, and switch S1–S2 in position #1, an output representing a balanced relationship between inputs is automatically provided only when corresponding inputs leads are energized, as for example, BI and BO or DI and DO. With the ganged switches SW1 through SW10 in position #2 an output representing a balanced relation between inputs is provided when corresponding input leads are energized and also when the input leads are non-corresponding but are not more than one position apart, as for example, BI and CO or DI and CO. With the ganged switches SW1 through SW10 in position #3 an output representing a balanced relationship between inputs is provided when corresponding input leads are energized and also when the energized input leads are not corresponding but are not more than two positions apart, as for example, BI and DO or DI and BO.

Although the preferred circuit is illustrated with the ganged switches SW1 through SW10 it will be obvious to those skilled in the art that jumper connections may be substituted for such switches so that, for example, switch SW4 would be eliminated and a jumper lead or connection may be made from lead 43 to lead 44 or to lead 46 to lead 72 as desired.

To provide for such comparison between inputs, when an input lead is energized, a relay of a bank of relays associated with and connected to such input lead responds to such energized lead by itself becoming energized. Thus, within the selector unit itself, the preferred form provides for energization of a relay, in a bank of relays, which represents a segment of measurements of a segmented scale of a measured factor.

It should be noted that the circuit diagram of a selector unit as presented herein is presented with all input leads deenergized and thus all relays deenergized.

Let it be assumed that a master controller of a traffic control system includes two cycle selectors each associated with a traffic actuable means, one cycle selector determining or measuring the volume of traffic inbound to a city, for example, on a roadway and the other cycle selector determining or measuring the volume of traffic traveling outbound, for example, from the same city, on the same roadway. Further assume that each of the two cycle selectors are provided with six potential output leads which are connected to the six corresponding inputs to the selector unit with each cycle selector connected to and associated with one bank of relays of a selector unit respectively, with a selector unit similar to that illustrated in FIG. 3. It will further be assumed that as illustrated in FIG. 3 the ganged switches SW1 through SW10 are in position #1 and the ganged switches S1–S2 are also in position #1.

Further assuming that the traffic volume detecting apparatus has been operating for a substantial period of time, let it also be assumed that the traffic flows in both directions are relatively medium and substantially equal so that one cycle selector, OCS, energizes input lead CO and the other cycle selector, ICS, energizes input lead CI to the selector unit, each representing traffic conditions, respectively.

Thus, with input lead CO energized relay COR becomes energized and with input lead CI energized relay CIR becomes energized. Energized relay COR will close its contact 31 and open its contact 32 while energized relay CIR will close its contact 33 and open its contact 34. Closure of contact 31 provides positive power, represented by a plus in a circle, to output lead IG through contact 31, lead 35, the arm of switch SW9, position #1 on switch SW9, lead 36, contact 39 of deenergized relay BIR, lead 40, contact 41 of deenergized relay AIR to lead 42 which connects to position #1 of switch S2, the arm of switch S2 to output lead IG.

Closed contact 33 provides positive power to output lead OG through contact 33, lead 43, the arm of switch SW4, position #1 of switch SW4, lead 44, contact 45 of deenergized relay BOR, lead 46, contact 49 of deenergized relay AOR, lead 50 which is connected to position #1 of switch S1, the arm of switch S1 to output lead OG.

Thus with the energization of corresponding relays as by energization of corresponding input leads which are representative of substantially balanced traffic volume between the two traffic flows on the roadway, the output leads IG and OG are energized and may be said to represent a condition of balanced traffic volume on the roadway on which the traffic volume is measured.

Referring to the circuitry of FIG. 3 will be obvious to those skilled in the art that energization of other corresponding relays as well as COR and CIR will provide positive power to energize both output leads IG and OG through respective circuits including series connected contacts of relays of the opposite bank, as previously described, with the exception of energization of relays AOR and AIR, which will supply positive power substantially directly to the position #1 of switch S1–S2 to the respective output leads.

Let it now be assumed that traffic conditions on the roadway alter and that outbound traffic volume increases so that the cycle selector OCS deenergizes lead CO and energizes lead DO while the inbound traffic volume remains substantially the same and the cycle selector ICS maintains lead CI energized. Energized lead DO energizes relay DOR and energized lead CI maintains relay CIR energized. Energized relay DOR closes its contact 51 and opens its contact 52 while relay CIR holds contact 33 closed and contact 34 open.

Positive power is applied via contact 51, lead 53, to the arm of switch SW8, position #1 of switch SW8, lead 54 but the circuit is now open at contact 34. This causes output lead IG to become deenergized while the output lead OG is maintained energized through the previously described circuit.

Thus with the relay DOR energized by lead DO and the relay CIR energized by the lead CI, with leads DO and CI being energized by their respective cycle selectors OCS and ICS indicating heavier outbound traffic volume than inbound traffic volume, then energization of lead OG and deenergization of lead IG may represent heavier outbound traffic volume than inbound traffic volume.

It will be noticed that the positive power supply of one bank of relays, except the lowest relay, as BOR through FOR for example follows through contacts of relays controlled by the opposite bank of relays AIR through EIR beginning with one relay lower than the energized relay. Thus positive power from the contact of relay FOR, for example, would be applied through normally closed contacts of the relay EIR, DIR, CIR, BIR and AIR so that if any of the relays EIR through AIR were energized the energizing circuit between the positive power contact, contact 44 of relay FOR, and the output lead IG, would be open. Thus the relay of the bank having the lowest energized relay as by receiving the lowest energized input, provides positive power from its closed contact, due to its being energized through normally closed contacts of the relays of the opposite bank starting one relay below the position of the energized relay to the output of the selector unit.

Of course if inbound traffic volume should exceed outbound traffic volume so that OCS may be caused to energize input CO, for example, and ICS may be caused to energize input DI, for example, the relays COR and DIR would become energized and the positive power circuit through contact 59 of relay DIR would be open at contact 32 so that output lead OG would be deenergized and the positive power circuit through contact 31, previously described would be complete to energize output lead IG. Thus the combination of output IG energized and OG deenergized may indicate that inbound traffic volume exceeds outbound traffic volume.

It may be desired to provide an indication of balanced inputs over a larger range of input differential between the banks of relays. In this connection the switches SW1 through SW10 are provided. In position #1, as previously described, the energization of corresponding relays of the opposing banks will provide an output representing balanced inputs or balanced traffic conditions and energization of non-corresponding relays will provide an output representing unbalanced inputs or traffic conditions and indicate which input or single traffic characteristic is higher in its respective scale.

With the ganged switches in position #2 the selector unit will provide an output representing balanced inputs or balanced traffic conditions when corresponding relays are energized and when the energized relays are non-corresponding but not more than one step or position apart. When the opposing energized relays of the respective banks are two or more positions or steps apart the selector unit will provide an output representative of unbalanced traffic conditions and will indicate which traffic characteristic is higher in its scale.

For example, with the ganged switches SW1 through SW10 in position #2 assume that the input leads CO and DI, non-corresponding inputs, are energized and cause the relays COR and DIR to be energized. Positive power will be applied to the output lead IG via contact 31, lead 35, the arm of switch SW9, position #2 of switch SW9, lead 56, lead 40, closed contact 41, lead 42 to position #1 of switch S2, the arm of switch S2 to output lead IG. Positive power will also be applied to the output lead OG via contact 59 of relay DIR, lead 60, the arm of switch SW3, position #2 of switch SW3, lead 61, lead 44, closed contact 45, lead 46, closed contact 49, lead 50 to position #1 of switch S1, the arm of switch S1 to output lead OG.

If, for example, the input leads BO and DI were energized so as to energize the relay BOR and DIR respectively then the positive power circuit through contact 59, lead 60, the arm of switch SW3, position #2 of switch SW3, lead 61, to lead 44 would be open at now open contact 45 of now energized relay BOR. Thus the output lead OG would be deenergized while the output lead IG would be energized from positive power through a circuit including closed contact 62 of relay BOR, lead 63, the arm of switch SW10, position #2 of switch SW10, lead 64, lead 42 to position #1 of switch S2, the arm of switch S2 to the output lead IG.

Thus the output of the selector unit may represent the energization of non-corresponding steps when the energized steps are not more than one step apart.

With the ganged switches SW1 through SW10 in position #3 the selector unit will provide an output representing balanced inputs or traffic conditions when corresponding relays are energized and when the energized relays are non-corresponding but are not more than two steps or positions apart.

When the energized relays are three or more positions or steps apart the selector unit will provide an output representative of unbalanced traffic conditions and will indicate which traffic characteristic is highest in its scale.

If, for example, the input leads EO and CI were energized by the respective cycle selectors OSC and ICS so as to cause relay EOR and relay CIR to be energized with the switches SW1 through SW10 on position #3 the output leads OG and IG would both be energized. Output lead IG would be energized via positive power through closed contact 65 of relay EOR, lead 66 to arm of switch SW7, position #3 of switch SW7, lead 69, lead 70, lead 36, closed contact 39, lead 40, closed contact 41, lead 42, position #1 switch S2 to the arm of switch S2, to lead IG. The output lead OG would be energized by positive power applied via contact 33, lead 43, the arm of switch SW4, position #3 of switch SW4, lead 71, lead 72, lead 50 position #1 of switch S1, the arm of switch S1 to lead OG.

If the non-corresponding inputs to the selector unit that were energized more than two positions apart the output of the selector unit would then be representative of unbalanced traffic conditions and would indicate which input was higher in its scale.

As for example if input leads BO and EI were both energized by the respective cycle selectors OCS and ICS the output lead IG would be energized from positive power via contact 62, lead 63, the arm of switch SW10, position #3 of switch SW10, lead 64, lead 42, position #1 of switch S2, the arm of switch S2 to output lead IG.

The output lead OG would be deenergized since the energizing circuit between the positive power and the lead OG would be open at contact 45 the circuit being partially completed from positive power via contact 73 of relay EIR, lead 74, the arm of switch SW2, position #3 of switch SW2, lead 75, lead 61, lead 44 to open contact 45 of relay BOR.

It should be understood that the output leads OG and IG of the selector unit in FIG. 3 may be used to control individual relays which may be associated with the selector unit so that when energized the respective relays may close contacts to provide power, either alternating current or direct current, to the remotely located local controllers in the traffic control system or the output leads themselves may be used to apply power directly to another component such as the delayed timer circuit illustrated in the FIG. 4.

If the control leads from the master controller to the local controllers were to be extended any distance it may be preferred to operate repeating relays locally with the output leads OG and IG and have the relays control contacts which would open and close circuits carrying heavier current and/or power to the remote local controllers.

Referring to FIG. 4 the circuit diagram of a delay timer that is represented in block form by broken line block DT in FIG. 1 is illustrated in one form in which it is assumed that the power applied to the circuit has been turned off.

At the top center of the diagram are two leads IG and OG. These leads may be the leads represented in FIG. 1 as extending from the block OS and also illustrated in FIG. 3 as the output leads of the selector unit, identically labeled.

The output leads of the delayed timer circuit are illustrated on the right side of the diagram and labeled IG' and OG'.

The delayed timer circuit includes nine relays, of which T1, T2 and T3 are each delayed pull-in relays or timed delay relays. The relay T1 may be delayed on pull in for a time up to 6 minutes, for example, while the relay T2 may be delayed on pull in for a time up to 20 seconds, for example, and the relay T3 may be delayed on pull in for a time up to three seconds, for example.

The delayed relay T3 may be referred to as a starting relay since its energizing circuit includes a series of "break" contacts that are individually controlled by the other relays, excluding the other delayed relays, in the circuit when power is first applied to the circuit after being turned off.

Thus when the power is initially turned on all the relays will be deenergized because of incompleted energizing circuits except delayed relay T3 which will immediately become energized through its series of "break" contacts and after a time delay will pull in and close its contact 80.

The energizing circuit of relay T3 provides positive power represented by a plus in a circle via contact 81 of deenergized relay IR, contact 82 of deenergized relay IP, contact 83 of deenergized relay LR, contact 84 of deenergized relay OP and contact 85 of deenergized relay OR to the coil of delayed relay T3 to ground, represented by a minus in a circle.

Closure of contact 80 completes a circuit to energize relay RLR from positive power through closed contact 80, leads 86, and 89 to the coil of relay RLR to ground.

Energized relay RLR closes its contacts 90, 91, 92 and 93. Contacts 92 and 93 with their associated contacts 94 and 95 respectively are what is known as "make-before-break" contacts and after contact 92 closes or makes, contact 94 opens or "breaks" and after contact 93 closes or "makes" contact 95 opens or "breaks."

Closure of contact 90 completes an energizing circuit for delayed relay T2 from positive power through contact 90, lead 96, the coil of relay T2 to ground. Relay T2, however, does not pull-in although it is energized, since it is a delayed pull in relay.

Closure of contact 91 completes a lock in circuit for relay RLR from positive power through closed contact 99 of relay T2, contact 100 of relay LR, lead 101, contact 91, lead 89 to the coil of relay RLR to ground.

The delayed timer circuit now awaits the time delay of T2 and remains with the output leads IG' and OG' deenergized. This condition remains regardless of the condition of the inputs IG and OG from the selector unit OS.

Upon pull-in of relay T2 contact 99 opens and its contact 102 closes. The opening of contact 99 breaks the holding circuit for the relay RLR, however relay RLR is still held in via its pull-in circuit, while closure of contact 102 provides an energizing circuit for the relay LR from positive power through now closed contact 102, lead 103 and 104 the coil of relay LR to ground.

Energized relay LR opens its contact 83 which causes relay T3 to drop out which opens its contact 80 and causes relay RLR to drop out. With the drop out of relay RLR contact 90 opens to open the energizing circuit of delayed relay T2 and relay T2 drops out.

Relay LR having been energized and pulled in closes its contacts, 105, 106 and 109. Closure of contact 105 provides a holding circuit for relay LR which is connected to positive power from the lead 104 via contact 105, lead 110, contact 111 of relay OR, contact 112 of relay OP, contact 113 of relay IP and contact 114 of relay IR.

It will be noticed that the holding circuit of relay LR includes grouped contacts of relays IR and IP and grouped contacts of relays OR and OP so that the pairs of relays IR and IP and OR and OP must be in corresponding conditions, that is, both relays of one pair either energized or deenergized to complete the holding circuit.

Closure of contact 106 opens contact 115 after contact 106 actually closes, which combination of contact is known in the art as a "make-before-break" contact. Closure of contact 109 causes contact 116 to open after contact 109 is actually closed this combination of contacts also being a "make-before-break" combination. With the closure of contact 109 the relay IR is electrically connected to and under the control of the selector unit via its output lead IG and with closure of contact 106 the relay OR is electrically connected to and under the control of the selector unit via its lead output OG.

The initial delay in the delay timer provides for a warm-up period for the electronic tubes in the electronic cycle computers which are to feed information to both sets of inputs of the selector unit so that an output via leads OG and IG may be provided.

As described in the said U.S. Patent 2,932,003 the electronic cycle computer will provide an output on the lowest part of its scale directly after initial warmup or if there are few or no actuations to provide a count or measurement. Thus when the system is initially turned on, after having been turned off so as to cool off the tubes below operating temperature, the heater elements of the tubes will arrive at an operating temperature and even without actuations the electronic cycle computer will energize the lowest lead in its scale.

Thus after the initial delay, to provide a warmup period, the two electric cycle computers may energize corresponding leads which will be applied as inputs to the selector unit which will compare the inputs and provide an output indicating corresponding inputs or balanced traffic conditions on the roadway and energize both output leads IG and OG to the delayed timer circuit. As subsequent actuations are received and counted the outputs of the respective electronic cycle computer may change according to the count received and the graduation of the respective scale.

Let it now be assumed that the traffic control system has just been turned on and that during the initial delay of the delayed timer the electronic tubes are heated to operating temperature and each electronic cycle computer energizes its lowest cycle position and the selector unit provides an output to the delayed timer circuit representing average or balanced traffic conditions, i.e. both output leads IG and OG of the selector unit to the delayed timer energized.

The relay T3 will first be energized and, after a delayed pull-in, will cause energization of relay RLR. Relay RLR will cause energization of relay T2 which will, after its delay period pull-in to cause relay LR to pull-in which in turn causes relay T3 to drop out which in turn causes relay RLR to drop out, all as described above.

Energization of relay LR provides for closure of certain of its contacts to electrically connect the relays IR and OR with the output leads IG and OG respectively, of the selector unit.

Thus with the leads IG and OG individually energized the relays IR and OR will be energized respectively, relay IR via positive power applied through output lead IG, of the selector unit contact 109, lead 119, the coil of relay IR to ground and relay OR via positive power applied through output lead OG, of the selector unit contact 106, lead 120, the coil of relay OR to ground.

Energized relay IR opens its contacts 81, 114 and 121 and closes its contacts 122, 123, 124, 125 and 126 and energized relay OR opens its contacts 85, 111 and 130 and closes its contacts 131, 132, 133, 134 and 135.

The opening of contact 134 breaks the holding circuit for the relay LR and relay LR drops out. As relay LR drops out its releases both contacts 109 and 106.

The opening of contacts 109 and 106 sever the electrical connections between the output leads IG and OG of the selector unit and the relays IR and OR respectively of the delayed timer circuit. Before contact 109 actually "breaks," contact 116 "makes" and completes a holding circuit for relay IR from positive power through contact 123, contact 116, lead 119 the coil of relay IR to ground. Before contact 106 actually "breaks" contact 115 "makes" and completes a holding circuit for relay OR from positive power through contact 132, contact 115, lead 120, the coil of relay OR to ground. Closure of contact 124 of relay IR provides output power via lead IG' to the local controllers of the traffic control system and closure of contact 133 of relay OR provides output power via lead OG' to the local controllers of the traffic control system.

Thus the output of the delayed timer circuit is caused to conform to the output of the selector unit during the time relays IR and OR are electrically connected to the output of the selector unit.

Closure of contact 122 of relay IR completes a circuit to energize delayed relay T1 from positive power through contact 122, contact 136 of relay IP to the coil of relay T1 to ground. However, relay T1 does not pull-in since it is delay-on pull-in for approximately 6 minutes for example.

Closure of contact 131 of relay OR also completes a parallel energizing circuit for delayed relay T1 via contact 131 and contact 139 of relay OP.

The delayed timer circuit now remains in a stable condition holding the outputs IG' and OG' constant and awaits the time delay of relay T1 to expire. With contacts 109 and 106 open so as to electrically sever output leads IG and OG from relays IR and OR respectively, the condition of the inputs IG and OG have no effect on the relay IR and OR and both relays remain locked in the same condition as they were in just prior to electrical severance, i.e., an energized condition, thus the output leads IG' and OG' remain energized. This insures a constant, stable output via the leads IG' and OG' to the local controllers of the traffic control system for at least the time delay of the delayed relay T1 even though the output of the selector unit may vary and fluctuate its output combination during this time.

At the expiration of the delay period the relay T1 pulls in and closes its contact 140 to complete a circuit to energize relay RLR from positive power through contact 99, contact 100, contact 140, lead 141, to the coil of relay RLR to ground. Upon closure of contact 92 of energized relay RLR the relay IP becomes energized via a circuit from positive power through contact 126, contact 92, the coil of relay IP to ground and upon closure of contact 93 of energized relay RLR the relay OP becomes energized via a circuit from positive power through contact 135, contact 93 the coil of relay OP to ground.

Closure of contact 91 completes a holding circuit for relay RLR through contacts 99, 100 and 91 as previously described.

Closure of contact 90 completes an energizing circuit for delayed relay T2 which does not pull in until the expiration of its time period.

The opening of contact 136 and closure of contact 143 by the relay IP for the delayed relay T1 opens the energizing circuit previously mentioned while the opening of contact 139 and the closing of contact 142 by relay OP opens the parallel energizing circuit for relay T1 and relay T1 drops out opening contact 140.

Contacts 113, 136 and 82 are opened and contacts 145, 143 and 149 are closed by relay IP and contacts 112, 139 and 84 are opened and contacts 144, 142 and 146 are closed by relay OP.

At the expiration of the delay period of relay T2 the relay pulls in and closes its contact 102 and opens its contact 99. Closure of contact 102 completes a pull-in circuit for relay LR, previously traced with the relay LR, closing its holding contact 105.

Closure of contact 105 completes a holding circuit for the relay LR from positive power through contact 125, contact 145, contact 144, contact 134, lead 110, contact 105, lead 104 the coil of relay LR to ground.

Energized relay LR closes contact 109 and 106 to reconnect the relays IR and OR to the output leads IG and OG respectively of the selector unit. Now the relays IR and OR will be either held energized or deenergized respectively, according to the present condition of the input leads IG and OG.

The opening of contact 99 breaks the holding circuit for the relay RLR and the contacts 92 and 93 are released but before the contacts actually break connection the respective contacts 94 and 95 are completed and the relays IP and OP are held energized via their respective holding circuits via contacts 149 and 146 respectively.

Now so long as both output leads IG and OG from the selector unit remains energized the delayed timer circuit remains in this stable condition with the relays IR and OR connected directly to the respective lead IG and OG through the respective contact 109 and 106, and with the output leads IG' and OG' of the delayed timer circuit both energized to conform with the condition of the output leads of the selector unit IG and OG.

Let it now be assumed that traffic conditions alter so that the electronic cycle computers energize non-corresponding steps or inputs in the respective scale to the selector unit which is reflected in the output of the selector unit so that the lead IG remains energized and the lead OG becomes deenergized.

Upon lead OG becoming deenergized relay OR becomes deenergized and contacts 85, 130 and 111 are closed and contacts 131, 132, 133, 134 and 135 are opened.

The opening of contact 133 deenergizes the lead OG' so that only output lead IG' to the traffic control system is energized. Thus the condition of leads IG' and OG' now conform with the present condition of leads IG and OG respectively. The opening of contact 134 breaks the holding circuit for the relay LR and relay LR drops out.

It should be noted that the pair of relays OR and OP are now in non-corresponding conditions, i.e., relay OR deenergized and relay OP energized which, when in non-corresponding conditions, cause the holding circuit for the relay LR to open and at the same time completes an energizing circuit for the delayed time relay T1.

With the drop out of relay LR contacts 109 and 106 open to electrically sever the connection between IG and OG and relays IR and OR respectively and the relays IR and OR lock over their own contacts in their present condition, i.e. relay IR energized and relay OR deenergized. With relay IR energized contact 124 is closed to hold output IG' energized and with relay OR deenergized contact 133 is open to hold output OG' deenergized. Now with the relays IR and OR electrically severed from the outputs IG and OG respectively the relays IR and OR lock in their present condition and hold the output leads IG' and OG' in their present condition, i.e. energized and deenergized respectively regardless of any change in condition of output leads IG and OG of the selector unit.

With relay OR now deenergized and relay OP held energized an energizing circuit for delayed relay T1 is closed to provide positive power via contacts 130 and 142 to the coil of T1 to ground to start timing the delay time period.

The delayed timer circuit is now held in this condition and awaits the expiration of the time period of delayed relay T1. This insures that the output from the master controller via IG' and OG' to the local controllers in the traffic control system shall remain unchanged for at least a minimum period to time.

After expiration of the delayed period, relay T1 pulls in and closes contact 140 which completes an energizing circuit for relay RLR previously traced. Contact 93 is closed and contact 95 is opened. The relay OP drops out because of open contact 135 in its energizing circuit and deenergized relay OP opens its contact 142 to drop out delay relay T1.

Closure of contact 90 completes an energizing circuit for delayed relay T2 which, after a time delay, pulls in, dropping out relay RLR and pulling in relay LR. Relay LR electrically connects relays IR or OR to the outputs IG and OG respectively of the selector unit and the relays assume the condition of the outputs IG and OG.

If at this time there is no difference in the condition of the leads IG and OG from when previous connections were least made, the delayed timer circuit will remain in the condition it is now in, i.e. with relay LR energized and relays IR or OR electrically connected to IG and OG, until a change of condition in the output leads IG and OG of the selector unit occurs.

Let it now be assumed that during the time delay period of relay T1 traffic conditions on the monitored roadway altered and that such altered traffic conditions are reflected in the output of the selector unit which now causes the lead OG to become energized and causes lead IG to become deenergized.

After expiration of the time delay of relay T1 the relay T1 pulls in and causes relay RLR to pull in thereby closing contacts 92 and 93. With closure of contacts 92 and 93 and opening of contacts 94 and 95 the relays IP and OP assume the conditions of the relays IR and OR respectively, that is relay OP becomes deenergized and relay IP becomes energized so that both pairs of relays are in the same condition, i.e. relays OR and OP deenergized and relays IR and IP energized.

With both pairs of relays in corresponding conditions the previously closed energizing circuit for relay T1 is opened at contact 139.

Upon energization and subsequent pull-in of delayed relay T2 the relay RLR drops out and the relays OP and IP are locked in their present condition. The relay LR pulls-in to electrically connect the relays IR and OR to the leads IG and OG respectively and the relays IR and OR assume the present condition of the leads IG and OG, that is relay IR becomes deenergized and relay OR becomes energized.

The non-corresponding condition of the pair of relays IR and IP open the holding circuit of relay LR at contacts 125 and 113 and close an energizing circuit for delayed relay T1 via contacts 121 and 143 while the non-corresponding condition of the pair of relays OR and OP open the holding circuit of relay LR at contact 111 and 144 and close an energizing circuit for delayed relay T1 via contacts 131 and 139, thus relay T1 becomes energized and starts timing the delay period and relay LR drops out, electrically severing the outputs IG and OG from relays IR and OR.

Closure of contact 133 and the opening of contact 124 energizes output lead OG' and deenergizes output lead IG' which outputs conform with the condition of the output of leads OG and IG respectively just prior to the electrical severance between the outputs OG and IG and the relays OR and IR respectively upon drop out of relay LR.

At termination of the timed period of the delayed relay T1 the cycle of operation may begin again, all as previously described, if there has been a change in the condition of the output leads IG and OG from that condition just prior to electrical severance last made.

Thus although each electronic cycle computer may respond to momentary changes in traffic conditions and the output of the selector unit may rapidly reflect such changes via its output leads IG and OG, the delayed timer circuit provides a means of maintaining the output of a master controller constant for at least a minimum period of time so that rapid, momentary radical changes of traffic conditions may not cause a change of output of the master controller multiple times during one traffic signal cycle.

It should be noted that the delayed relays T3 and T2 may each be associated with a resistance-capacitance type timing component to provide the desired delay. The delayed relay T1 may be associated with an adjustable, automatically resettable timer, either mechanical or otherwise that may be used to time the period desired. Also the relay T1 may be made to delay on drop-out as well as on pull-in and the functions of the relay RLR may be incorporated into the functions of the delayed relay T1.

It was previously mentioned that the inputs into the selector unit may be inverted in value so that, for example, the inputs AO and AI may represent a segment of measurements at the high end of their respective scale and the inputs FO and FI may represent a segment of measurements at the low end of their respective scale, with the in between inputs inverted in value accordingly.

With the values of the inupts into the selector unit inverted, obviously the input with the higher value will be found at a lower position in the scale than the input with the lower value.

Also with the values of the inputs inverted the output of the selector unit, which represents the relation between two opposing inputs, is also inverted.

It was previously disclosed that when two opposing and non-corresponding inputs of substantially similar scales were applied to the selector unit the input which was lower in value, and thus lower in position, would cause energization of the output under the opposite bank of relays, thus, in effect, the low position, low value input energizes the output lead representing the high value input and interrupts the circuit of the output representing the low value input.

However, with the values inverted, the low position, high value input will cause energization of the output lead previously energized by the low position, low value input. Thus the output would represent the relation between the inputs, in reverse.

One way of compensating for this reversal of output is to cross the output leads IG and OG of the selector unit so that the inverted output lead IG would connect to the normal connections of normal lead OG and connect the inverted output lead OG to the normal connections of normal lead IG.

It may be desired to add additional contacts and circuitry to each relay of each bank of the selector unit so as to provide one energized output from a scale of six potential outputs for example, the energized output corresponding to the highest energized input into the selector unit.

Additional contacts and circuitry, similar to that taught by John L. Barker in his said U.S. Patent 2,542,978 may be added to the present selector unit so as to obtain an output corresponding to the highest energized input into the selector unit.

A system of cascaded, modified selector units may be used in a traffic control system where one modified selector unit receives traffic information from two cycle selectors, one cycle selector providing information on, for example, northbound traffic on Street X and another cycle selector providing information on, for example, northbound traffic on Street Y, so that the first modified selector unit will provide an output from a six position scale of outputs, corresponding to the highest northbound traffic.

A second modified selector unit may receive traffic information from two other cycle selectors, one cycle selector providing information on, for example, southbound traffic on Street X and another cycle selector providing information on, for example, southbound traffic on Street Y, so that the second modified selector unit will provide an output from a six position scale of outputs, corresponding to the highest southbound traffic.

The six potential outputs from the first selector unit and the six potential outputs from the second selector unit may be applied to a third modified selector unit for determining the relation between the highest northbound traffic and the highest southbound traffic through outputs similar to IG and OG, for example, which may be used for offset and/or Split selection and may also provide an energized output from a scale of potential output corresponding to the highest input, into the third modified selector unit for example, which output may be used to select the length of a cycle of the several local controllers by controlling, for example, a variable cycle generator.

Although alternate arrangements of apparatus according to the invention have been pointed out above, it will be obvious to those skilled in the art that other modifications of the apparatus or in the arrangement or character of its parts may be made without departing from the spirit of the invention.

I claim:

1. Traffic control apparatus including in combination first and second traffic measuring means for measuring traffic individually from different traffic sources, each said measuring means providing one output respectively from a plurality of outputs respectively, each output of each said plurality representing a segment of measurements respectively in a respective segmented scale of traffic measurements, said one output of each said measuring means representing a segment of traffic measurements into which the respective traffic measurement falls, a first series circuit including a plurality of normally closed switch means, connected in series, a second series circuit including a plurality of normally closed switch means, connected in series, each said circuit including a plurality of connection points located in progressive order in said first circuit and said second circuit from one end to the other respectively, means for selectively connecting a control signal to one of said points in said first and said second series circuits respectively in order in accordance with the outputs of said second and first traffic measuring means respectively, means for opening one switch means of each said plurality of normally closed switch means in said first and said second series circuits respectively in order in accordance with the outputs of said first and second traffic measuring means respectively and output circuit means, controlled by the respective said series circuits, and the respective said control signals so selectively connected, and the position, relative to each other, of the respective one switch means of each said series circuit so opened for connecting said control signal through at least a part of the respective series circuits for providing selectively a first, a second or a third final output respectively in dependence upon the relations between the respective traffic measurements of said first and second traffic measuring means in accordance with whether the said one output of the first traffic measuring means represents a segment which is at least a predetermined number of segments higher than the segment represented by said one output of the second traffic measuring means or the said one output of the said first traffic measuring means represents a segment which is at least a predetermined number of segments lower than the segment represented by the said one output of the said second traffic measuring means or the said one output of the said first traffic measuring means represents a segment which is at least less than a predetermined number of segments higher and at least less than a predetermined number of segments lower than the segment represented by the said one output of the said second traffic measuring means, respectively.

2. Traffic control apparatus as in claim 1 and including switching means for selectively bridging one or more of successive said switch means for a plurality of said connection points of corresponding order in said first and second series circuits for providing connection of said control signal to said output circuit means despite opening of the bridged switch means, whereby a controllable differential, between the respective traffic measurements, is permitted, said differential corresponding to said predetermined amount, without interruption of the through connection of said control signal.

3. Traffic control apparatus as in claim 2 and including additional first, second and third final output means corresponding to the last mentioned first, second and third final outputs, and time controlled means for selectively rendering one of said additional output means effective in accordance with the one of said last mentioned outputs so provided, said time controlled means including means for assuring a minimum time between any changes in selection among said output means in response to any change among said outputs so provided.

4. Traffic control apparatus as in claim 1 and including addition first, second and third final output means corresponding to the last mentioned first, second and third final outputs, and time controlled means for selectively rendering one of said additional output means effective in accordance with the one of said last mentioned outputs so provided, said time controlled means including means for assuring a minimum time between any changes in selection among said output means in response to any change among said outputs so provided.

5. In a traffic control system for selecting among plural control output circuits in accordance with the relative values of plural traffic measurements, and having means for measuring a traffic characteristic from one traffic source, means for measuring a traffic characteristic from a second traffic source, each of said traffic measuring means having a multiplicity of output circuits representing a scale of low to high values of the traffic characteristic measured and the scale being divided into segments corresponding to the respective output circuits of its set of said multiple output circuits, one of the multiple output circuits of each set being activated at any time in accordance with the scale segment selected by the respective traffic measuring means, and means for selecting among the first mentioned plural output circuits in accordance with the relative scale positions of the activated circuits of the respective sets, the improved combination in the last named means comprising a first group of relays individually controlled by the individual circuits of the first set of multiple first traffic measurement circuits, a second group of relays individually controlled by individual circuits of the second set of multiple second traffic measurement circuits, a plurality of multiple contact means each including a make contact and a break contact each respective multiple contact means controlled by the respective individual relays, first circuit means for controlling one of said first mentioned plural outputs and including a succession of alternate circuit paths through break contacts of successively higher order relays of said first group except the last break contact of said first group and make contacts of successively further higher order relays of the second group, and second circuit means for controlling a second output of said first mentioned plural outputs and including a succession of alternate circuit paths through break contacts of successively higher order relays of said second group except the last break contact of said second group and make contacts of successively further higher order relays of the first group.

6. A traffic control system responsive to traffic measurements in a plurality of directions comprising a source of control signal for controlling traffic apparatus, a plurality of first means individually responsive to progressively higher order traffic measurements in a first traffic direction, a plurality of second means individually responsive to progressively higher order traffic measurements in a second traffic direction, each means of said plurality of first means and each means of said plurality of second means including a normally conducting switch means and a normally non-conducting switch means each said switch means having at least two terminals and said switch means individually reversible to non-conducting and conducting conditions respectively upon operation of the one means of which the respective pair of switch means are a part, means for connecting said normally conducting switch means of each said means of said first means in a first series circuit and means for connecting said normally conducting switch means of each means of said second means in a second series circuit, means for providing a control signal, means for coupling one terminal of each of the normally non-conducting switch means individually to said means for providing said control signal, individual second coupling means for coupling the other terminal of each of said first means and each of said normally non-conducting switch means of said second means to the second series circuit and the first series circuit respectively at normally conducting switch means of progressively lower order so that a control signal will flow through both series circuits in response to traffic measurements of less than a predetermined difference in the two traffic directions and will flow through only one of the series circuit in response to measurement of one traffic direction being at least a predetermined difference greater than the traffic measurement in the other traffic direction respectively.

7. Selector apparatus for traffic control systems, including multiple input circuit means actuatable one at a time to represent a scale of low to high traffic measurement for one traffic direction, second multiple input circuit means actuatable one at a time to represent a substantially similar scale of low to high traffic measurements for second traffic direction, output circuit means for a control system favoring traffic in one of said directions, second output circuit means for a control system favoring traffic in the other of said directions, two groups of relays, the individual relays of the first group being individually responsive respectively to individual respective input circuits of the first multiple input circuit means and the individual relays of the second group being similarly individually responsive to individual respective input circuits of the second multiple input circuit means, normally open contacts and normally closed contacts individual to the respective relays of each group, a succession of alternative parallel circuits including normally closed contacts of any ordered relays higher than a predetermined number of first in order relays of the first group and normally open contacts of higher ordered relays of the second group for controlling one of said output circuit means, a further succession of alternative parallel circuits including normally closed contacts of any order relays higher than a predetermined number of first in order relays of the second group and normally open contacts of higher ordered relays of the first group for controlling another of said output circuit means.

8. Selector apparatus as in claim 7 and including third output means for non-preferential control of traffic in the first and second directions, and means including both of said successions of alternative parallel circuits for controlling said third output means.

9. Selector apparatus including a first group of relays of progressive order representative of successive segments respectively of a segmented scale of values and any one relay of which is operated at any one time, a second group of relays of progressive order representative of successive segments respectively of a second segmented scale of values and any one relay of which is operated at any one time, make contacts individual to the respective relays and break contacts individual to all but the last relay of said progressive order of each group, a circuit connecting, in series, the break contacts of the said first group of relays and connection points to said circuit between the successive break contacts, and before the first break contact, and beyond the last break contact of the said first group of relays, branch circuits connected each from a different one of said connection points and each said branch circuit including a make contact of a different relay respectively of the said second group of relays of order corresponding to that of the relay of said first group immediately above the respective one said connection point, a first output circuit connection to the end of said series circuit before said first break contact of said first relay group, a further circuit connecting in series, the break contacts of the said second group of relays, and further connection points between the successive break contacts, and before the first break contact, and beyond the last break contact of the said second group of relays, branch circuits connected each said branch circuit from a different one of the said further connection points and each said branch circuit including a make contact of a different relay respectively of said first group of relays, of order corresponding to that of the relay of said second group immediately above the respective one said further connection point, and a second output circuit connection to the end of said further series circuit before said first break contact of said second relay group.

References Cited by the Examiner

UNITED STATES PATENTS

| 2,542,978 | 2/1951 | Barker | 340—31 |
| 2,750,576 | 6/1956 | Beaubien | 340—37 |
| 2,750,776 | 6/1956 | Beaubien | 340—37 |
| 2,832,060 | 4/1958 | Hendricks | 340—35 |
| 2,834,001 | 5/1958 | Wilcox | 340—35 |
| 2,925,583 | 2/1960 | Jeffers | 340—35 |

NEIL C. READ, *Primary Examiner.*

BENNETT G. MILLER, THOMAS B. HABECKER,
*Examiners.*